United States Patent
Liu et al.

(10) Patent No.: US 9,245,562 B1
(45) Date of Patent: Jan. 26, 2016

(54) MAGNETIC RECORDING WRITER WITH A COMPOSITE MAIN POLE

(71) Applicant: Western Digital (Fremont), LLC, Fremont, CA (US)

(72) Inventors: Feng Liu, San Ramon, CA (US); Zhanjie Li, Pleasanton, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 0 days.

(21) Appl. No.: 14/673,748

(22) Filed: Mar. 30, 2015

(51) Int. Cl.
*G11B 5/147* (2006.01)
*G11B 5/60* (2006.01)
*G11B 5/11* (2006.01)
*G11B 5/127* (2006.01)

(52) U.S. Cl.
CPC .............. *G11B 5/6082* (2013.01); *G11B 5/11* (2013.01); *G11B 5/1278* (2013.01); *G11B 5/147* (2013.01)

(58) Field of Classification Search
CPC ........... G11B 5/127; G11B 5/33; G11B 5/147
USPC .............. 360/125.3, 125.03, 125.09, 125.04, 360/125.17, 125.12, 125.06, 125.15, 360/125.26, 125.19
See application file for complete search history.

(56) References Cited

U.S. PATENT DOCUMENTS

| | | |
|---|---|---|
| 5,293,359 A | 3/1994 | Ohta et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |

(Continued)

OTHER PUBLICATIONS

Takuya Matsumoto, et al., "Integrated head design using a nanobeak antenna for thermally assisted magnetic recording," Optics Express, vol. 20, No. 17, Aug. 13, 2012, pp. 18946-18954.

*Primary Examiner* — Allen T Cao

(57) ABSTRACT

A magnetic transducer with a composite main pole and methods for fabricating the magnetic transducer are provided. The magnetic transducer includes a main pole having at least a first portion and a second portion. The first portion includes a first magnetic material and has a first side forming at least a portion of an air bearing surface (ABS) of the main pole. The second portion includes a second magnetic material that is different from the first magnetic material, and the second portion is spaced apart from the ABS. The main pole may further include a third portion, where the second portion and the third portion are each located at one of the trailing side or the leading side of the main pole, with the third portion made of magnetic material that is different from the first magnetic material, and the third portion being spaced apart from the ABS.

20 Claims, 5 Drawing Sheets

(56) References Cited

U.S. PATENT DOCUMENTS

| | | |
|---|---|---|
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,493,183 B1 | 12/2002 | Kasiraj et al. |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,453 B1 | 10/2003 | Parker |
| 6,633,464 B2 | 10/2003 | Lai et al. |
| 6,636,394 B1 | 10/2003 | Fukagawa et al. |
| 6,636,460 B2 | 10/2003 | Akiyama et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,671,127 B2 | 12/2003 | Hsu et al. |
| 6,674,594 B1 | 1/2004 | Wakabayashi et al. |
| 6,674,610 B1 | 1/2004 | Thomas et al. |
| 6,680,863 B1 | 1/2004 | Shi et al. |

(56) References Cited

U.S. PATENT DOCUMENTS

| | | |
|---|---|---|
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,728,080 B2 | 4/2004 | Ito et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,741,524 B2 | 5/2004 | Ichihara et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,795,380 B2 | 9/2004 | Akiyama et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,804,175 B2 | 10/2004 | Ruigrok et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,873,576 B1 | 3/2005 | Van Kesteren |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,984,333 B2 | 1/2006 | Matono et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,042,810 B2 | 5/2006 | Akiyama et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,068,453 B2 | 6/2006 | Terris et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,180,705 B2 | 2/2007 | Matono et al. |
| 7,190,539 B1 | 3/2007 | Nibarger |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,262,936 B2 | 8/2007 | Hamann et al. |
| 7,268,973 B2 | 9/2007 | Lille |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,382,580 B2 | 6/2008 | Maat |

(56) References Cited

U.S. PATENT DOCUMENTS

| | | |
|---|---|---|
| 7,386,933 B1 | 6/2008 | Krounbi et al. |
| 7,389,577 B1 | 6/2008 | Shang et al. |
| 7,395,595 B2 | 7/2008 | Lee et al. |
| 7,417,832 B1 | 8/2008 | Erickson et al. |
| 7,419,891 B1 | 9/2008 | Chen et al. |
| 7,426,092 B2 | 9/2008 | Fukui et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,457,080 B2 | 11/2008 | Watabe et al. |
| 7,483,243 B2 | 1/2009 | Fukui et al. |
| 7,493,688 B1 | 2/2009 | Wang et al. |
| 7,508,627 B1 | 3/2009 | Zhang et al. |
| 7,518,826 B2 | 4/2009 | Matono et al. |
| 7,522,376 B2 | 4/2009 | Matono et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,529,158 B2 | 5/2009 | Matsumoto et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,646,564 B2 | 1/2010 | Maruyama et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,773,331 B2 | 8/2010 | Akagi et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,804,655 B2 | 9/2010 | Shimazawa et al. |
| 7,819,979 B1 | 10/2010 | Chen et al. |
| 7,821,732 B2 | 10/2010 | Komura et al. |
| 7,829,264 B1 | 11/2010 | Wang et al. |
| 7,835,102 B2 | 11/2010 | Takayama et al. |
| 7,846,643 B1 | 12/2010 | Sun et al. |
| 7,848,053 B2 | 12/2010 | Mochizuki et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,881,019 B2 | 2/2011 | Hsiao et al. |
| 7,889,456 B2 | 2/2011 | Jiang et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,050,150 B2 | 11/2011 | Mihara et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,085,498 B2 | 12/2011 | Bai et al. |
| 8,089,831 B2 | 1/2012 | Chou et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 * | 7/2012 | Tran et al. ............... 360/125.07 |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,411 B2 | 9/2012 | Yang et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,792 B2 | 9/2012 | Bai et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,516 B1 * | 10/2012 | Tang et al. ............... 360/125.03 |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |

(56) References Cited

U.S. PATENT DOCUMENTS

| | | | |
|---|---|---|---|
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,151 B2 | 1/2013 | Katine et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,379,347 B2 | 2/2013 | Guan et al. |
| 8,381,391 B2 | 2/2013 | Park et al. |
| 8,385,020 B2 | 2/2013 | Min |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,416,646 B2 | 4/2013 | Huang et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,079 B1 * | 7/2013 | Song et al. ............... 360/125.3 |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 * | 8/2013 | Liu et al. ............... 360/125.13 |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,514 B2 | 11/2013 | Sasaki et al. |
| 8,576,517 B1 | 11/2013 | Tran et al. |
| 8,578,594 B2 | 11/2013 | Jiang et al. |
| 8,582,234 B2 | 11/2013 | Linville et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |

(56) References Cited

U.S. PATENT DOCUMENTS

| | | |
|---|---|---|
| 8,797,692 B1 | 8/2014 | Guo et al. |
| 8,804,282 B1* | 8/2014 | Sugiyama et al. ....... 360/125.12 |
| 8,813,324 B2 | 8/2014 | Emley et al. |
| 8,848,315 B2 | 9/2014 | Yang et al. |
| 9,053,715 B1* | 6/2015 | Wang .................... G11B 5/3116 |
| 2003/0128633 A1 | 7/2003 | Batra et al. |
| 2008/0165452 A1* | 7/2008 | Bozeman et al. ............. 360/319 |
| 2010/0073802 A1 | 3/2010 | Komura et al. |
| 2010/0290157 A1 | 11/2010 | Zhang et al. |
| 2011/0086240 A1 | 4/2011 | Xiang et al. |
| 2011/0280515 A1 | 11/2011 | Black et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0257305 A1 | 10/2012 | Tang et al. |
| 2012/0298621 A1 | 11/2012 | Gao |
| 2012/0327531 A1* | 12/2012 | Takahashi et al. .............. 360/75 |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

* cited by examiner

MAGNETIC RECORDING WRITER WITH A COMPOSITE MAIN POLE

BACKGROUND

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks are generally formed of two main substances, namely, a substrate material that gives it structure and rigidity, and a magnetic media coating that holds the magnetic impulses or moments that represent data. Such typical disk drives also typically include a read head and a write head, generally in the form of a magnetic transducer, which can sense and/or change the magnetic fields stored on the disks or media. Perpendicular magnetic recording (PMR) involves recorded bits that are stored in a generally planar recording layer, but in a generally perpendicular or out-of-plane orientation with respect to the recording layer. A PMR read head (reader) and a PMR write head (writer) are usually formed as an integrated read/write head along an air-bearing surface (ABS). In a PMR reader, a magnetoresistive (MR) sensor or transducer is frequently employed in the read head, and the write head includes a write pole for directing a magnetic field to the recording layer of a magnetic recording medium or stack.

DETAILED DESCRIPTION

In the following description, numerous specific details are set forth to provide a thorough understanding of various embodiments of the present invention. It will be apparent, however, to one skilled in the art that these specific details need not be employed to practice various embodiments of the present invention. In other instances, well-known components or methods have not been described in detail to avoid unnecessarily obscuring various embodiments of the present invention.

A perpendicular magnetic recording (PMR) writer with a short yoke length can enable a hard drive to achieve higher data rate, for example, 2500 megabit per second (Mb/s) and beyond. Aspects of the present disclosure provide apparatuses, systems and methods of utilizing a PMR writer with a main pole design that realizes a shorter yoke writer as compared to the related art. The disclosed PMR writer design may be characterized by a main pole made of a composite magnetic material having different magnetic properties. In one aspect of the disclosure, the PMR writer is a component of a magnetic recording head and may have a first portion and a second portion, where the first portion is along an air bearing surface (ABS) of the magnetic recording head and the second portion is spaced apart from the ABS. In one aspect of the disclosure, the first portion has a different magnetic property than that of the second portion. In one aspect of the disclosure, the different magnetic property may be different materials, different magnetic moments, and/or different magnetic stress. In one aspect, the PMR writers disclosed herein may provide higher magnetic moment and/or magnetic stress at the writer pole tip, in the ABS vicinity, so as to enable sufficient write field and field gradient at the ABS than related art writers.

Figure 1:
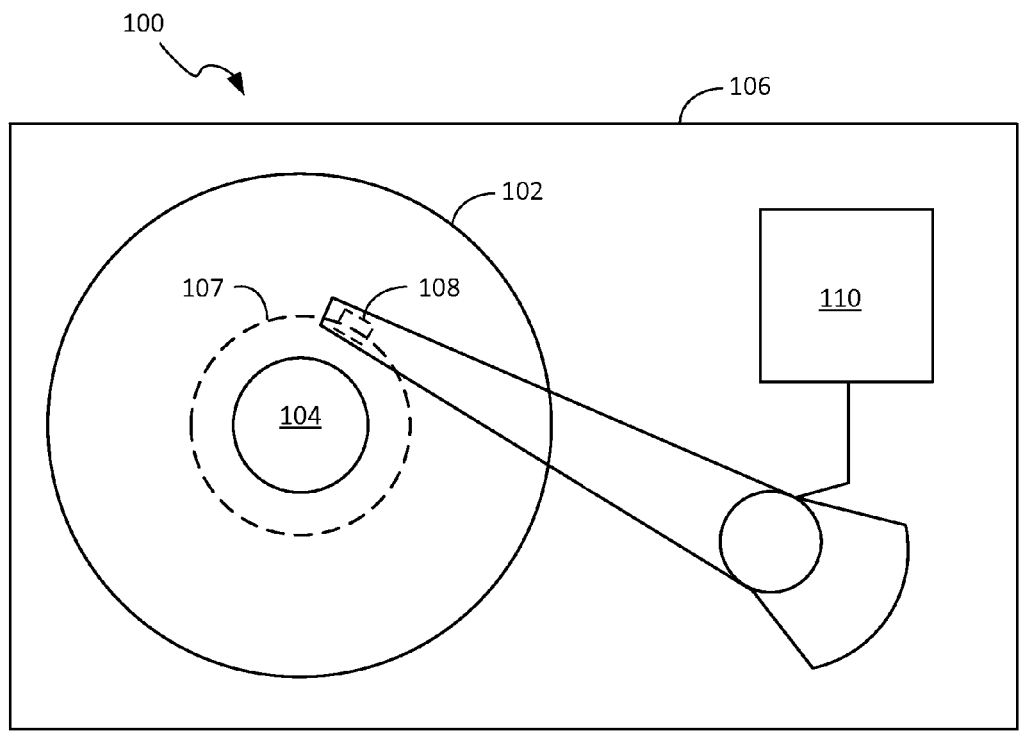
FIG. 1 is a top schematic view of a disk drive including a slider with an integrated read/write head in accordance with one embodiment of the invention.

FIG. 1 is a top schematic view of a disk drive 100 including a slider 108 with an integrated read/write head (e.g., a magnetic transducer) in accordance with one embodiment of the invention. The slider 108 is a magnetic recording device. Disk drive 100 may include one or more of the disks/media 102 to store data. Disks/media 102 reside on a spindle assembly 104 that is mounted to drive housing 106. Data may be stored along tracks 107 in the magnetic recording layer of disk 102. The reading and writing of data is accomplished with the slider 108 that can have an integrated read/write head or magnetic transducer. The write head (e.g., a magnetic writer 108a in FIG. 2) is used to alter the properties of the magnetic recording layer of disk 102 and thereby write information thereto. The read head (e.g., a magnetic reader 108b in FIG. 2) is used to read information stored on the magnetic recording layer of disk 102. In operation, a spindle motor (not shown) rotates the spindle assembly 104, and thereby rotates disk 102 to position head 108 at a particular location along a desired disk track 107. The position of the slider 108 relative to the disk 102 may be controlled by position control circuitry 110.

Figure 2:
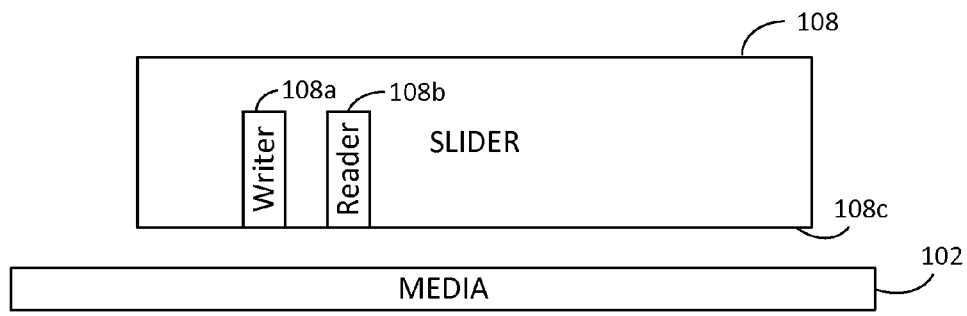
FIG. 2 is a side schematic view of the slider of FIG. 1 with an integrated magnetic recording head in accordance with one embodiment of the invention.

FIG. 2 is a side schematic view of the slider 108 of FIG. 1 with the writer 108a and reader 108b in accordance with one embodiment of the invention. The slider 108 includes both the writer 108a and the reader 108b disposed along an air bearing surface (ABS) 108c of the slider. The ABS 108c is the bottom surface of the slider 108 and is the slider surface that is closest to the media 102. However, it should be appreciated that the present disclosure is not limited to the fabrication of slider or similar devices. To the contrary, the concept and technique described in various aspects of the disclosure may be applied in the fabrication of other apparatuses or devices.

Figure 3:
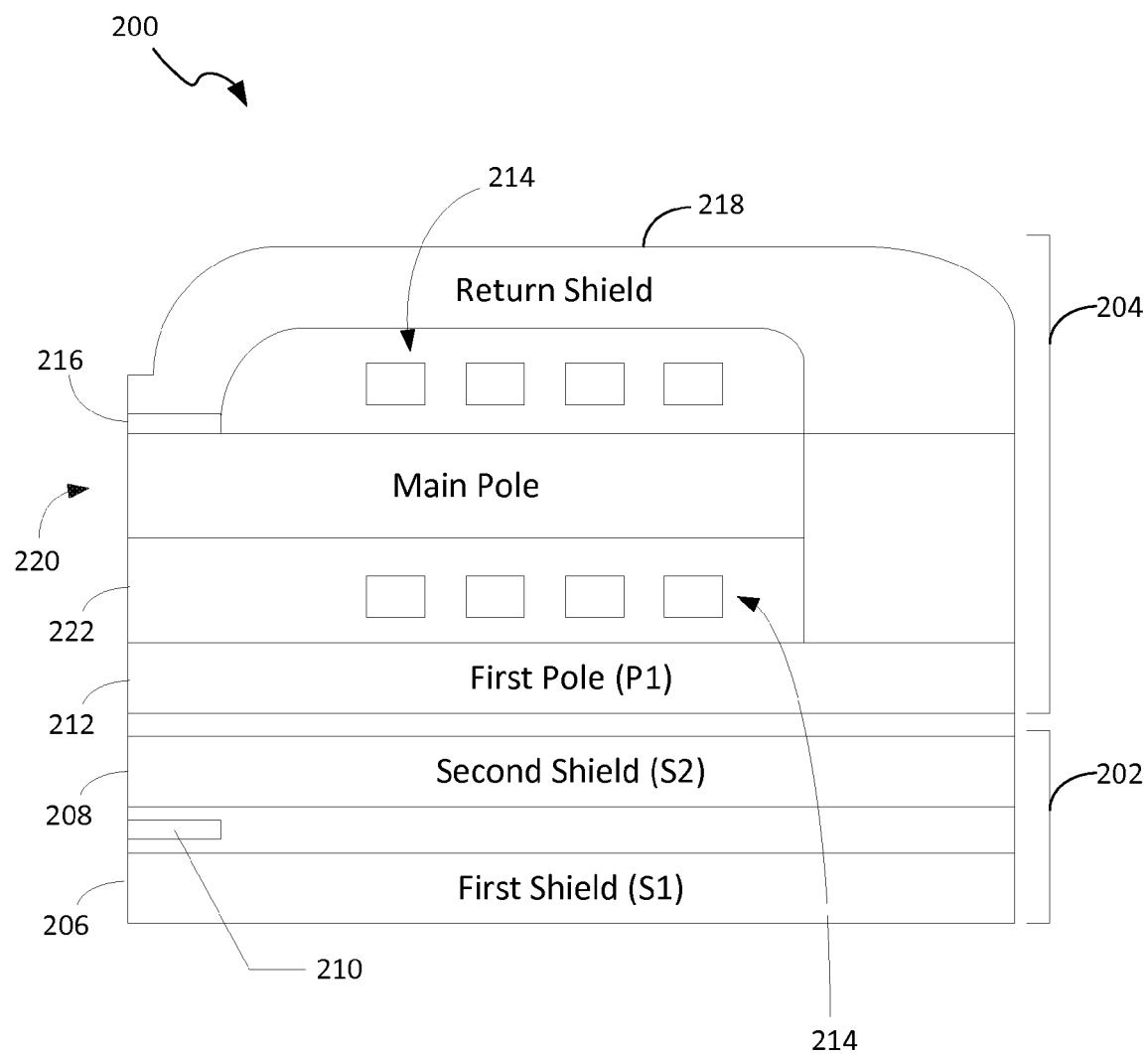
FIG. 3 is a side schematic view illustrating an embodiment of a magnetic recording head.

FIG. 3 is a side schematic view illustrating an embodiment of a magnetic recording head 200. For clarity, FIG. 3 is not drawn to scale. In addition, some components and layers may not be shown in FIG. 3. The magnetic recording head 200 may be the writer 108a and reader 108b included in the slider 108 of FIG. 2. The magnetic recording head 200 includes a read transducer 202 (read head) and a write transducer 204 (write head). In other embodiments, the magnetic recording head 200 may include only the read transducer 202 or the write transducer 204. The read transducer 202 includes first and second shields 206 and 208 as well as a read sensor 210 between the first and second shields. The write transducer 204 may be a PMR transducer and include a first pole 212, coils 214, write gap 216, return shield 218, and main pole 220. The main pole 220 resides on an underlayer 222. In some embodiments, some portions of the write transducer 204 may be omitted. For example, the return shield 218 may be omitted. In some embodiments, different portions of the main pole 220 may have different magnetic properties (e.g., magnetic moment, magnetic stress, and magnetic materials) so as to improve Wide Area Track Erasure (WATER) performance.

Figure 4:
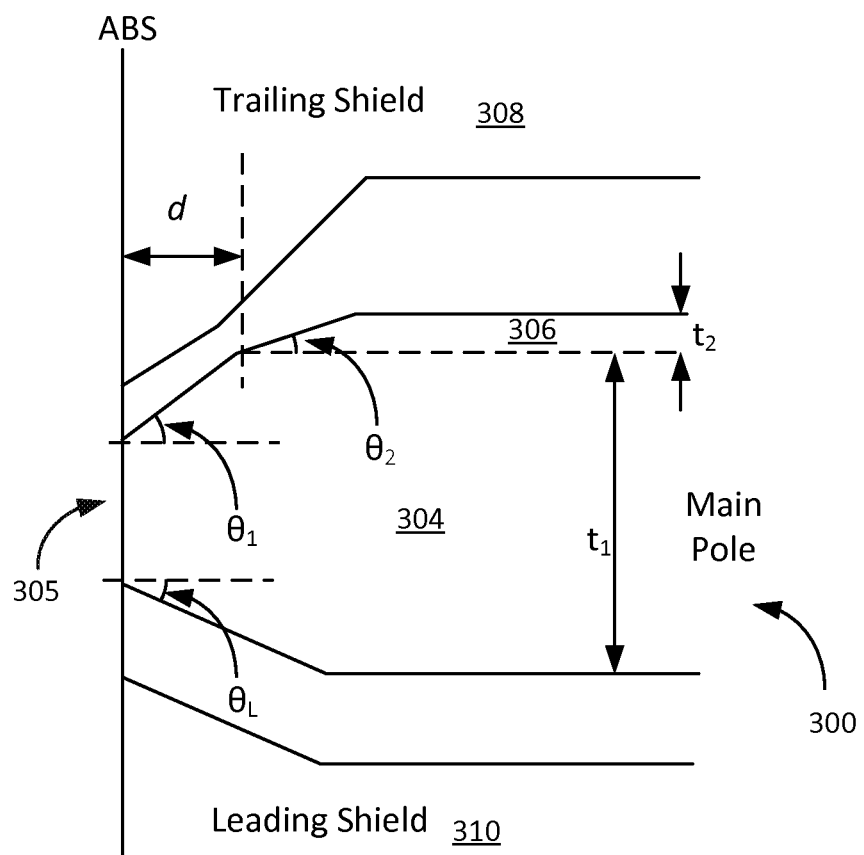
FIG. 4 is a schematic drawing illustrating a side view of a magnetic transducer main pole having two distinct portions with different magnetic properties in accordance with a first embodiment of the present invention

FIG. 4 is a schematic drawing illustrating a side view of a main pole 300 having two distinct portions with different magnetic properties in accordance with an embodiment of the present invention. The main pole 300 may be utilized as the main pole 220 of FIG. 3. The main pole 300 may be designed such that it can mitigate excessive writer flux leakage away from the writer pole in near and far track regions, which can reduce distortions on the writer shields and thus improve Wide Area Track Erasure margin resulting in improved reliability performance.

The main pole 300 is generally shaped with a first bevel angle $\theta_1$ with respect to a plane perpendicular to an air bearing surface (ABS) at the trailing edge side. In some embodiments, the main pole 300 may be shaped with a leading side bevel angle $\theta_L$ (same or different from the first bevel angle $\theta_1$) with respect to the ABS at the leading edge side. The main pole 300 has different magnetic properties in at least two different portions thereof. In some embodiments, the magnetic properties include a magnetic moment and a magnetic stress of the material.

In the embodiment shown in FIG. 4, the main pole 300 includes a first portion 304 and a second portion 306. The first portion 304 and second portion 306 may have the same length or different lengths in a direction normal to the ABS. In some embodiments, for example, the length of the second portion 306 may be dependent on its thickness ($t_2$ in FIG. 4). The first and second portions are configured to generate a magnetic field or flux for writing information to a magnetic medium (e.g., media 102 of FIG. 1). The magnetic property of the first and second portions may be different. The first and second portions may be made of different magnetic materials or a composite material. The main pole 300 also may include a trailing shield 308 along a trailing side of the main pole and a leading shield 310 along a leading side of the main pole. In some embodiments, one of the trailing shield 308 or leading shield 310 may be omitted. Between the trailing shield 308 and the main pole 300, and/or between the leading shield 310 and the main pole 300, may be one or more layers of non-magnetic material such as Ru, Al2O3, NiCr, Ta, or other suitable non-magnetic materials.

In one embodiment, the first portion 304 may include a first magnetic material, and has a first side forming at least a portion 305 of the ABS of the main pole. The second portion 306 may include a second magnetic material that is different from the first magnetic material, and is spaced apart or recessed from the ABS. In FIG. 4, the second portion 306 is positioned at a distance d from the ABS. In some embodiments, for example, the distance d and the thickness of the second portion 306 may be inversely proportional. In several embodiments, for example, the distance d may be equal to or less than about 150 nanometers (nm). In one particular example, the distance d may be between about 80 nm and about 130 nm. In the embodiment illustrated in FIG. 4, a thickness t1 of the first portion 304 is greater than a thickness t2 of the second portion 306. In one example, the combined thickness (t1+t2) is about 310 nm. In one particular example, the thickness t1 of the first portion 304 is about 250 nm, and the thickness t2 of the second portion 306 is about 60 nm. In other embodiments, the first portion 304 and second portion 306 may have other suitable thicknesses so long as the thickness t1 is greater than the thickness t2.

In some embodiments, a first magnetic moment of the first portion 304 is greater than a second magnetic moment of the second portion 306. In one particular example, the first magnetic moment may be about 2.35 Tesla (T), and the second magnetic moment may be about 2.0 T. In some embodiments, a first magnetic stress of the first portion 304 is greater than a second magnetic stress of the second portion 306. In some examples, at least one of the first magnetic moment and first magnetic stress of the first portion 304 is greater than the same magnetic property of the second portion 306. In one embodiment, the magnetic property of the first portion 304 and second portion 306 may be realized by utilizing a pulse plating process that adjusts a plating current so as to plate different magnetic materials in the same plating bath. For example, the different portions may be different in iron (Fe) weight or atomic percentage.

In some embodiments, the first portion 304 includes a first magnetic alloy that includes a first magnetic material, and the second portion 306 includes a second magnetic alloy that includes a second magnetic material. The second magnetic material of the second magnetic alloy is different from the first magnetic material of the first magnetic alloy. In one embodiment, the first portion 304 has at least one material that is not included in the second portion 306. In one embodiment, the second portion 306 has at least one material that is not included in the first portion 304. In one embodiment, the first portion 304 and the second portion 306 are formed of completely different materials. In some embodiments, the first portion 304 and the second portion 306 are formed of the same materials but at different percentages (weight or atomic percentage) of the same materials. In some examples, the first magnetic alloy and the second magnetic alloy may be any of the alloys illustrated in table 1 and combinations thereof.

TABLE 1

| Composition | X and Y values in weight percentage |
|---|---|
| Co(x)Fe(1-x) | 25 < x < 35 |
| Fe(x)Ni(1-x) | 65 < x < 75 |
| Co(x)Ni(y)Fe(1-x-y) | 65 < x < 75; 10 < y < 20 |
| Fe(x)Ni(1-x) | 45 < x < 55 |

In the embodiment of FIG. 4, the first portion 304 has a first beveled side forming the first angle $\theta_1$ with respect to a plane perpendicular to the ABS, and the second portion 306 has a second beveled side forming a second angle $\theta_2$ with respect to the plane perpendicular to the ABS. In various embodiments, the first angle 302 and second angle 312 may be substantially the same or different. In some embodiments, the first bevel angle $\theta_1$ and the second angle $\theta_2$ may be substantially the same and are between about 20 degrees and about 35 degrees, and in one particular example between about 22 degrees and about 28 degrees. In some embodiments, the first angle $\theta_1$ is greater than the second angle $\theta_2$, and are between about 20 degrees and about 35 degrees.

The above described writer main pole 300 may have a higher magnetic moment and/or magnetic stress at the writer pole tip (first portion 304) in the ABS vicinity so as to enable sufficient write field and field gradient at the ABS. The second portion 306, which may have a lower magnetic moment and/or magnetic stress at a distance d behind the ABS, can mitigate excessive writer flux leakage away from the writer pole in near and far track regions. Therefore, distortions on the writer shields may be reduced, and the Wide Area Track Erasure reliability margin may be improved as compared to related art writers.

Figure 5:
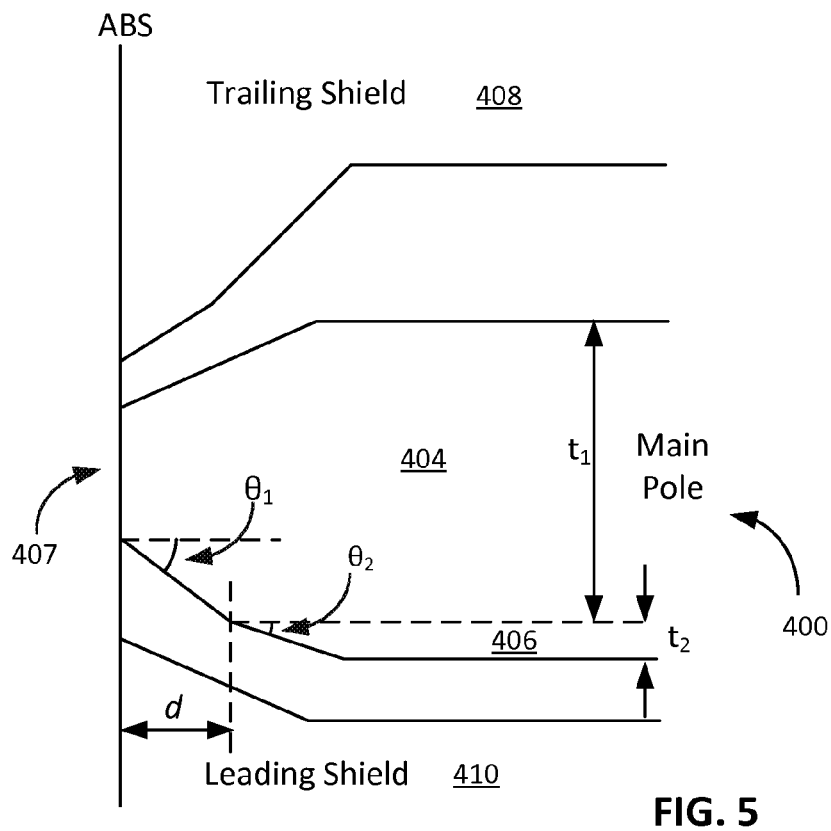
FIG. 5 is a schematic drawing illustrating a side view of a magnetic transducer main pole having two distinct portions with different magnetic properties in accordance with a second embodiment of the present invention.

FIG. 5 is a schematic drawing illustrating a side view of a main pole 400 having portions with different magnetic properties in accordance with an embodiment of the present disclosure. The main pole 400 may be utilized as the main pole 220 of FIG. 3. The main pole 400 is similar to the main pole 300. Therefore, description of similar features presented in both embodiments that have been described above may be omitted. Similar to the main pole 300, the main pole 400 also has different magnetic properties in at least two different portions. In some embodiments, the magnetic properties include a magnetic moment, a magnetic stress, and materials of the main pole 400.

In the embodiment shown in FIG. 5, the main pole 400 includes a first portion 404 and a second portion 406. The first portion 404 and second portion 406 may have the same length or different lengths in a direction normal to the ABS. In some embodiments, for example, the length of the second portion 406 may be dependent on its thickness ($t_2$ in FIG. 5). The first and second portions are configured to generate a magnetic field or flux for writing information to a magnetic medium (e.g., media 102 of FIG. 1). The magnetic property of the first and second portions may be different. The first and second portions may be made of different magnetic materials or a composite material. The main pole 400 also includes a trailing shield 408 along a trailing side of the main pole and a leading shield 410 along a leading side of the main pole. In some embodiments, one of the trailing shield 408 or leading shield 410 may be omitted. Between the trailing shield 408 and the main pole 400, and/or between the leading shield 410 and the main pole 400, may be one or more layers of non-magnetic material such as Ru, Al2O3, NiCr, Ta, or other suitable non-magnetic materials.

In one embodiment, the first portion 404 includes a first magnetic material, and has a first side forming at least a portion 407 of the ABS of the main pole. The second portion 406 includes a second magnetic material that is different from the first magnetic material, and is spaced apart from the ABS. In FIG. 5, the second portion 406 is positioned at a distance d from the ABS. In some embodiments, for example, the distance d and the thickness of the second portion 406 may be inversely proportional. In several embodiments, for example, the distance d may be equal to or less than about 150 nm. In one particular example, the distance d may be between about 80 nm and about 130 nm. In the embodiment illustrated in FIG. 5, a thickness t1 of the first portion 404 is greater than a thickness t2 of the second portion 406. In one example, the combined thickness (t1+t2) is about 310 nm. In one particular example, the thickness t1 of the first portion 404 is about 250 nm, and the thickness t2 of the second portion 406 is about 60 nm. In other embodiments, the first portion 404 and the second portion 406 may have other suitable thicknesses as long as the first thickness t1 is greater than the second thickness t2.

In some embodiments, a first magnetic moment of the first portion 404 is greater than a second magnetic moment of the second portion 406. In one particular example, the first magnetic moment may be about 2.35 T, and the second magnetic moment may be about 2.0 T. In some embodiments, a first magnetic stress of the first portion 404 is greater than a second magnetic stress of the second portion 406. In some examples, at least one of the first magnetic moment and first magnetic stress of the first portion 404 is greater than the same magnetic property of the second portion 406. The magnetic property of the first portion 404 and second portion 406 may be realized by a pulse plating process that adjusts a plating current so as to plate different magnetic materials in the same plating bath. In some examples, the first portion 404 and second portion 406 may be different in iron (Fe) weight or atomic percentage.

In some embodiments, the first portion 404 includes a first magnetic alloy that includes a first magnetic material, and the second portion 406 includes a second magnetic alloy that includes a second magnetic material. The second magnetic material of the second magnetic alloy is different from the first magnetic material of the first magnetic alloy. In one embodiment, the first portion 404 has at least one material that is not included in the second portion 406. In one embodiment, the second portion 406 has at least one material that is not included in the first portion 404. In one embodiment, the first portion 404 and the second portion 406 are formed of completely different materials. In some embodiments, the first portion 404 and the second portion 406 are formed of the same materials but at different percentages (weight or atomic percentage) of the same materials. In some examples, the first magnetic alloy and the second magnetic alloy may be any of the alloys illustrated in table 1 above and combinations thereof.

In the embodiment of FIG. 5, the first portion 404 has a first beveled side forming a first angle $\theta_1$ with respect to a plane perpendicular to the ABS, and the second portion 406 has a second beveled side forming a second angle $\theta_2$ with respect to the plane perpendicular to the ABS. In various embodiments, the first angle $\theta_1$ and second angle $\theta_2$ may be substantially the same or different. In some embodiments, the first angle $\theta_1$ and the second angle $\theta_2$ may be between about 30 degrees and about 60 degrees.

The above described writer main pole 400 may have a higher magnetic moment and/or magnetic stress at the writer pole tip in the ABS vicinity so as to enable sufficient write field and field gradient at the ABS. The second portion 406, which may have a lower magnetic moment and/or magnetic stress at a distance d behind the ABS, can mitigate excessive writer flux leakage away from the writer pole in near and far track regions. Therefore, distortions on the writer shields may be reduced, and the Wide Area Track Erasure reliability margin may be improved as compared to related art writers.

Figure 6:
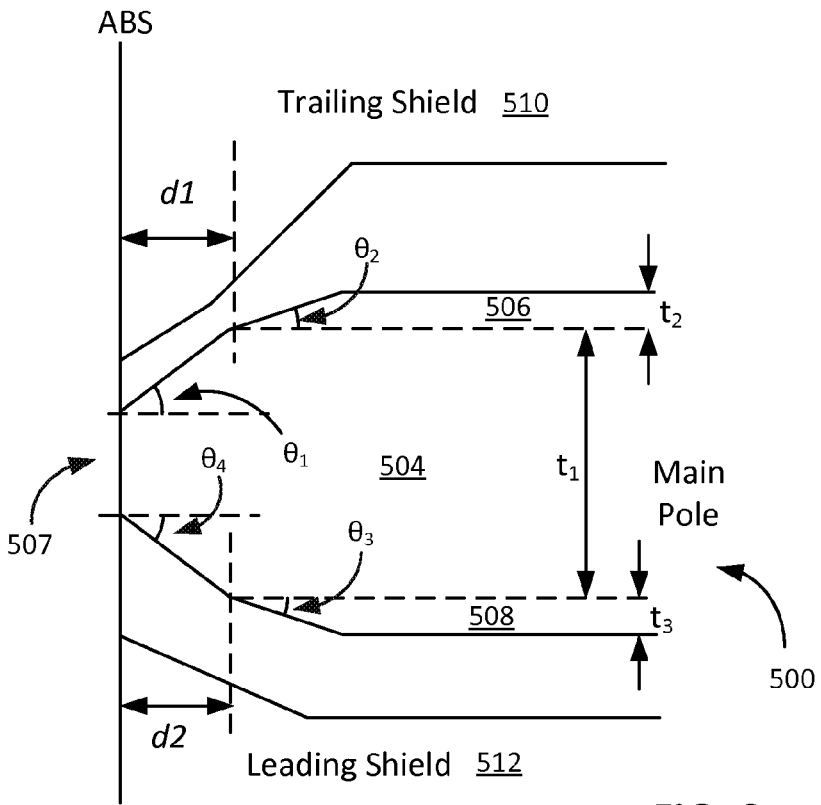
FIG. 6 is a schematic drawing illustrating a side view of a magnetic transducer main pole having three portions with different magnetic properties in accordance with a third embodiment of the present invention.

FIG. 6 is a schematic drawing illustrating a side view of a main pole 500 having portions with different magnetic properties in accordance with an embodiment of the present disclosure. The main pole 500 may be utilized as the main pole 220 of FIG. 3. The main pole 500 is similar to the main poles 300 and 400. Therefore, description of similar features that have been described above may be omitted. Similar to the main poles 300 and 400 of FIGS. 4 and 5, the main pole 500 also has different magnetic properties in different portions. In some embodiments, the magnetic properties include a magnetic moment, a magnetic stress, and materials of the main pole.

In the embodiment shown in FIG. 6, the main pole 500 includes at least a first portion 504, a second portion 506, and a third portion 508. The first portion 504, second portion 506 and third portion 508 may have the same length or different lengths in a direction normal to the ABS. In some embodiments, for example, the length of the second portion 506 may be dependent on its thickness ($t_2$ in FIG. 6), and the length of the third portion 508 may be dependent on its thickness ($t_3$ in FIG. 6). The first, second and third portions are configured to generate a magnetic field or flux for writing information to a magnetic medium (e.g., media 102 of FIG. 2). The magnetic property of the first, second, and third portions may be different. The first, second and third portions may be made of different magnetic materials or a composite material. The main pole 500 also includes a trailing shield 510 along a trailing side of the main pole and a leading shield 512 along a leading side of the main pole. In some embodiments, one of the trailing shield or leading shield may be omitted. Between the trailing shield 510 and the main pole 500, and/or between the leading shield 512 and the main pole 500, may be one or more layers of non-magnetic material such as Ru, Al2O3, NiCr, Ta, or other suitable non-magnetic materials.

In one embodiment, the first portion 504 includes a first magnetic material, and has a first side forming at least a portion 507 of the ABS of the main pole 500. The second portion 506 includes a second magnetic material that is different from the first magnetic material, and the second portion 506 is spaced apart from the ABS. The third portion 508 includes a third magnetic material that is different from the first and/or second magnetic material, and the third portion 508 is spaced apart from the ABS. In FIG. 6, the second portion 506 is positioned at a distance d1 from the ABS, and the third portion 508 is positioned at a distance d2 from the ABS. In some embodiments, for example, the distance d1 and the thickness of the second portion 506 may be inversely proportional, and the distance d2 and the thickness of the third portion 508 may be inversely proportional. In several embodiments, for example, the distances d1 and d2 may be equal to or less than about 150 nanometers (nm). In one particular example, the distances d1 and d2 may be between about 80 nm and about 130 nm. In various embodiments, the distances d1 and d2 may be the same or different. In the embodiment illustrated in FIG. 6, a thickness t1 of the first portion 504 is greater than a thickness t2 of the second portion 506 and a thickness t3 of the third portion 508. In one example, the combined thickness (t1+t2+t3) is about 310 nm. In other embodiments, the thicknesses (t1, t2 and t3) may have other suitable thicknesses as long as the thickness t1 is greater than the thicknesses t2 and t3. In some embodiments, the thicknesses t2 and t3 may be the same or different.

In some embodiments, a first magnetic moment of the first portion 504 is greater than a second magnetic moment of the second portion 506 and a third magnetic moment of the third portion 508. The magnetic moments of the second portion 506 and third portion 508 may be the same or different. In one particular example, the first magnetic moment may be about 2.35 T, and the second and third magnetic moments may be about 2.0 T. In some embodiments, a first magnetic stress of the first portion 504 is greater than a second magnetic stress of the second portion 506 and a third magnetic stress of the third portion 508. The second and third magnetic stresses may be the same or different. In some examples, at least one of the first magnetic moment and first magnetic stress of the first portion 504 is greater than the same magnetic property of the second portion 506 and third portion 508. The magnetic property of the first portion 504, second portion 506 and third portion 508 may be realized by a pulse plating process that adjusts a plating current so as to plate different magnetic materials in the same plating bath. For example, the first portion 504, second portion 506 and third portion 508 may be different in iron (Fe) weight or atomic percentage.

In some embodiments, the first portion 504 includes a first magnetic alloy that includes a first magnetic material, the second portion 506 includes a second magnetic alloy that includes a second magnetic material, and the third portion 508 includes a third magnetic alloy that includes a third magnetic material. The second magnetic material of the second magnetic alloy is different from the first magnetic material of the first magnetic alloy. The third magnetic material of the third magnetic alloy is different from the first magnetic material of the first magnetic alloy. In various embodiments, the second magnetic material of the second magnetic alloy may be different or the same as the third magnetic material of the third magnetic alloy. In one embodiment, the first portion 504 has at least one material that is not included in the second portion 506 and/or third portion 508. In one embodiment, the second portion 506 has at least one material that is not included in the first portion 504 and/or third portion 508. In one embodiment, the third portion 508 has at least one material that is not included in the first portion 504 and/or second portion 506. In one embodiment, the first portion 504, second portion 506 and third portion 508 are formed of completely different materials. In some embodiments, the first portion 504, second portion 506 and third portion 508 are formed of the same materials but at different percentages (weight or atomic percentage) of the same materials. In some examples, the first magnetic alloy, second magnetic alloy and third magnetic alloy may be any of the alloys illustrated in table 1 above, and combinations thereof.

In the embodiment of FIG. 6, the first portion 504 has a first beveled side forming a first angle $\theta_1$ with respect to a plane perpendicular to the ABS, and the second portion 506 has a second beveled side forming a second angle $\theta_2$ with respect to the plane perpendicular to the ABS. In various embodiments, the first angle $\theta_1$ and second angle $\theta_2$ may be substantially the same or different. In some embodiments, the first angle $\theta_1$ and the second angle $\theta_2$ may be between about 20 degrees and about 35 degrees. In some embodiments, the first angle $\theta_1$ is greater than the second angle $\theta_2$.

The third portion 508 has a third beveled side forming a third angle $\theta_3$ with respect to the plane perpendicular to the ABS. The first portion 504 also has a fourth beveled side forming a fourth angle $\theta_4$ with respect to the plane perpendicular to the ABS. In some embodiments, the fourth angle $\theta_4$ and the third angle $\theta_3$ may be between about 30 degrees and about 60 degrees. In various embodiments, the fourth angle $\theta_4$ and third angle $\theta_3$ may be substantially the same or different. In various embodiments, the second angle $\theta_2$ and third angle $\theta_3$ may be substantially the same or different. In various embodiments, the first angle $\theta_1$ and fourth angle $\theta_4$ may be substantially the same or different.

Figure 7:
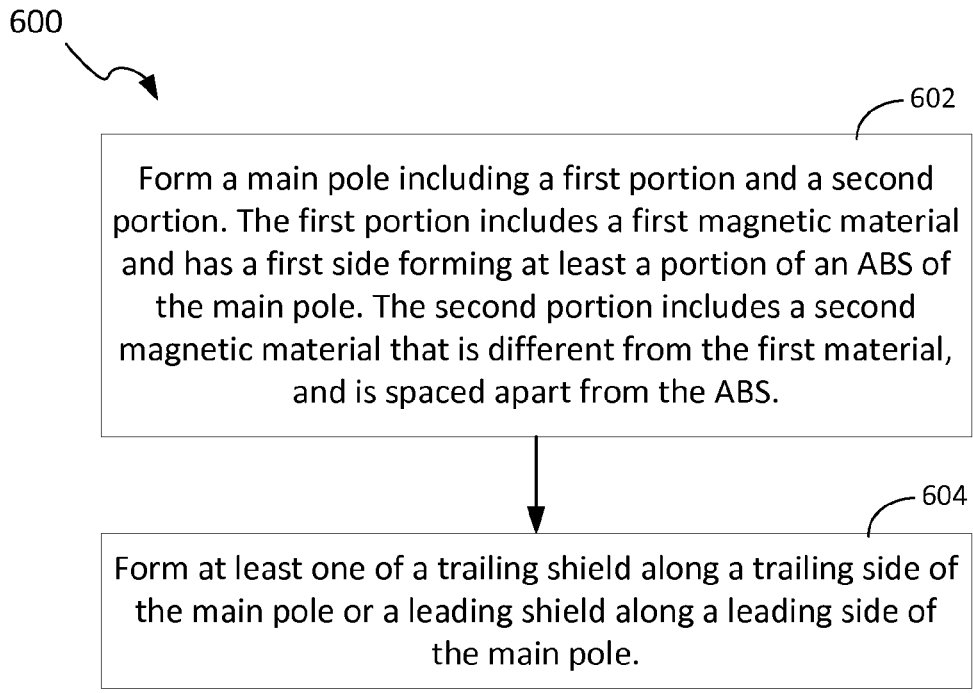
FIG. 7 is a flow chart illustrating a magnetic recording head fabrication method in accordance with an embodiment of the present invention.

FIG. 7 is a flow chart illustrating a magnetic recording head fabrication method 700 in accordance with an embodiment. The method 700 may be utilized to fabricate a magnetic recording head including any of the main pole designs described above and illustrated in FIGS. 3-6. For reasons of clarity, some generally known steps may be omitted. For example, the method 700 may omit steps or processes for forming other layers of a magnetic recording read or transducer. At block 602, the process forms a main pole including a first portion and a second portion. For example, the main pole may be the main pole 220 formed on an underlayer 222. The first portion includes a first magnetic material and has a first side forming at least a portion of an ABS of the main pole. The second portion includes a second magnetic material that is different from the first material, and is spaced apart from the ABS. At block 604, the process forms at least one of a trailing shield along a trailing side of the main pole or a leading shield along a leading side of the main pole. The second portion may be formed on the trailing edge side or leading edge side of the main pole.

In some embodiments, the process may form additional components. For example, the main pole may further include a third portion, and the second portion and the third portion are each located at one of the trailing edge side or the leading edge side of the main pole. The third portion includes a third magnetic material that is different from the first magnetic material, and the third portion is spaced apart from the ABS.

Figure 8:
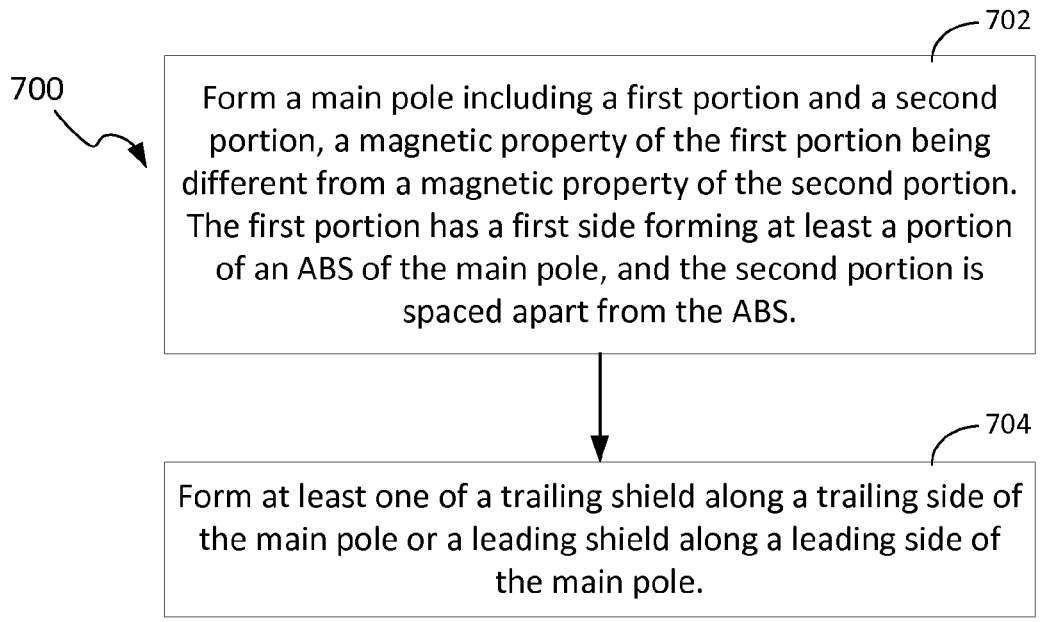
FIG. 8 is a flow chart illustrating a magnetic recording head fabrication method in accordance with another embodiment of the present invention.

FIG. 8 is a flow chart illustrating a magnetic recording head fabrication method 800 in accordance with an embodiment. The method 800 may be utilized to fabricate a magnetic recording head including any of the main pole designs described above and illustrated in FIGS. 3-6. For reasons of clarity, some generally known steps may be omitted. For example, the method 800 may omit steps or processes for forming other layers of a magnetic recording reader or transducer. At block 702, the process forms a main pole including a first portion and a second portion. For example, the main pole may be the main pole 220 formed on an underlayer 222. A magnetic property of the first portion is different from a magnetic property of the second portion. The first portion has a first side forming at least a portion of an ABS of the main pole, and the second portion is spaced apart from the ABS. At block 704, the process forms at least one of a trailing shield along a trailing side of the main pole or a leading shield along a leading side of the main pole. The second portion may be formed on the trailing edge side or leading edge side of the main pole.

In some embodiments, the process may form additional components. For example, the main pole may further include a third portion, and the second portion and the third portion are each located at one of the trailing edge side or the leading edge side of the main pole. The third portion includes a third magnetic material that is different from the first magnetic material, and the third portion is spaced apart from the ABS.

In some embodiments, the processes illustrated in FIGS. 7 and 8 can perform sequence of actions in a different order than depicted. In another embodiment, the process can skip one or more of the actions. In other embodiments, one or more of the actions may be performed simultaneously. In some embodiments, additional actions can be performed.

The terms "on," "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

It shall be appreciated by those skilled in the art in view of the present disclosure that although various exemplary fabrication methods are discussed herein with reference to magnetic read heads. In several embodiments, the deposition of such layers can be performed using a variety of deposition sub-processes, including, but not limited to plating, pulse current plating, physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic recording head comprising:
   a main pole comprising a first portion and a second portion; and
   at least one of a trailing shield along a trailing side of the main pole or a leading shield along a leading side of the main pole,
   wherein the first portion comprises a first magnetic material, the first portion having a first side forming at least a portion of an air bearing surface (ABS) of the main pole,
   wherein the second portion comprises a second magnetic material that is different from the first magnetic material, the second portion being spaced apart from the ABS,
   wherein the first portion has a first beveled side, a first end and a second end, the first beveled side extending between the first end and the second end, the first end being proximate the ABS,
   wherein the second portion has a second beveled side, a third end and a fourth end, the second portion extending between the third end and the fourth end, and the third end being proximate the second end of the first portion, and
   wherein the first beveled side and the second beveled side form a first angle and a second angle, respectively, with respect to a plane perpendicular to the ABS, and the first angle and the second angle are substantially the same.

2. The magnetic recording head of claim 1, wherein the first magnetic material has a first magnetic moment that is greater than a second magnetic moment of the second magnetic material.

3. The magnetic recording head of claim 1, wherein the first magnetic material has a first magnetic stress that is greater than a second magnetic stress of the second magnetic material.

4. A magnetic recording head comprising:
   a main pole comprising a first portion and a second portion; and
   at least one of a trailing shield along a trailing side of the main pole or a leading shield along a leading side of the main pole,
   wherein the first portion comprises a first magnetic material, the first portion having a first side forming at least a portion of an air bearing surface (ABS) of the main pole,
   wherein the second portion comprises a second magnetic material that is different from the first magnetic material, the second portion being spaced apart from the ABS, wherein the main pole further comprises a third portion, where the second portion and the third portion are each located at one of the trailing side or the leading side of the main pole, and
wherein the third portion comprises a third magnetic material that is different from the first magnetic material, the third portion being spaced apart from the ABS.

5. The magnetic recording head of claim 4, wherein the third magnetic material is different from that of the second magnetic material.

6. The magnetic recording head of claim 4, wherein the third magnetic material is substantially the same as that of the second magnetic material.

7. A magnetic recording head comprising:
a main pole comprising a first portion and a second portion; and
at least one of a trailing shield along a trailing side of the main pole or a leading shield along a leading side of the main pole,
wherein the first portion comprises a first magnetic material, the first portion having a first side forming at least a portion of an air bearing surface (ABS) of the main pole,
wherein the second portion comprises a second magnetic material that is different from the first magnetic material, the second portion being spaced apart from the ABS,
wherein the first portion has a first beveled side, a first end and a second end, the first beveled side extending between the first end and the second end, the first end being proximate the ABS,
wherein the second portion has a second beveled side, a third end and a fourth end, the second portion extending between the third end and the fourth end, and the third end being proximate the second end of the first portion, and
wherein the first beveled side and the second beveled side form a first angle and a second angle, respectively, with respect to a plane perpendicular to the ABS, and the first angle and the second angle are different.

8. A magnetic recording head comprising:
a main pole comprising a first portion and a second portion; and
at least one of a trailing shield along a trailing side of the main pole or a leading shield along a leading side of the main pole,
wherein the first portion comprises a first magnetic material, the first portion having a first side forming at least a portion of an air bearing surface (ABS) of the main pole,
wherein the second portion comprises a second magnetic material that is different from the first magnetic material, the second portion being spaced apart from the ABS,
wherein the first portion comprises a first magnetic alloy comprising the first magnetic material;
wherein the second portion comprises a second magnetic alloy comprising the second magnetic material; and
wherein the first magnetic alloy and the second magnetic alloy each comprise an alloy selected from the group consisting of CoFe, FeNi, CoNiFe, and combinations thereof, wherein the second magnetic material of the second magnetic alloy is different from the first magnetic material of the first magnetic alloy.

9. A magnetic recording head comprising:
a main pole comprising a first portion and a second portion, a magnetic property of the first portion being different from a magnetic property of the second portion; and
at least one of a trailing shield along a trailing side of the main pole or a leading shield along a leading side of the main pole,
wherein the first portion has a first side forming at least a portion of an air bearing surface (ABS) of the main pole,
wherein the second portion is spaced apart from the ABS,
wherein the first portion has a first beveled side, a first end and a second end, the first beveled side extending between the first end and the second end, the first end being proximate the ABS,
wherein the second portion has a second beveled side, a third end and a fourth end, the second portion extending between the third end and the fourth end, and the third end being proximate the second end of the first portion, and
wherein the first beveled side and the second beveled side form a first angle and a second angle, respectively, with respect to a plane perpendicular to the ABS, and the first angle and the second angle are substantially the same.

10. The magnetic recording head of claim 9, wherein the first portion has a first magnetic moment that is greater than a second magnetic moment of the second portion.

11. The magnetic recording head of claim 9, wherein the first portion has a first magnetic stress that is greater than a second magnetic stress of the second portion.

12. The magnetic recording head of claim 9, wherein the first portion and the second portion comprise different magnetic materials.

13. A magnetic recording head comprising:
a main pole comprising a first portion and a second portion, a magnetic property of the first portion being different from a magnetic property of the second portion; and
at least one of a trailing shield along a trailing side of the main pole or a leading shield along a leading side of the main pole,
wherein the first portion has a first side forming at least a portion of an air bearing surface (ABS) of the main pole,
wherein the second portion is spaced apart from the ABS,
wherein the main pole further comprises a third portion, wherein the second portion and the third portion are each located at one of the trailing side or the leading side of the main pole, and
wherein a magnetic property of the third portion is different from that of the first portion, the third portion being spaced apart from the ABS.

14. The magnetic recording head of claim 13, wherein the magnetic property of the third portion is different from that of the second portion.

15. The magnetic recording head of claim 13, wherein the magnetic property of the third portion is substantially the same as that of the second portion.

16. A magnetic recording head comprising:
a main pole comprising a first portion and a second portion, a magnetic property of the first portion being different from a magnetic property of the second portion; and
at least one of a trailing shield along a trailing side of the main pole or a leading shield along a leading side of the main pole,
wherein the first portion has a first side forming at least a portion of an air bearing surface (ABS) of the main pole,
wherein the second portion is spaced apart from the ABS,
wherein the first portion has a first beveled side, a first end and a second end, the first beveled side extending between the first end and the second end, the first end being proximate the ABS,
wherein the second portion has a second beveled side, a third end and a fourth end, the second portion extending between the third end and the fourth end, and the third end being proximate the second end of the first portion, and wherein the first beveled side and the second beveled side form a first angle and a second angle, respectively, with respect to a plane perpendicular to the ABS, and the first angle and the second angle are different.

17. The magnetic recording head of claim 16, wherein the first angle is greater than the second angle.

18. A magnetic recording head comprising:
a main pole comprising a first portion and a second portion, a magnetic property of the first portion being different from a magnetic property of the second portion; and
at least one of a trailing shield along a trailing side of the main pole or a leading shield along a leading side of the main pole,
wherein the first portion has a first side forming at least a portion of an air bearing surface (ABS) of the main pole,
wherein the second portion is spaced apart from the ABS,
wherein the first portion comprises a first magnetic alloy comprising a first magnetic material;
wherein the second portion comprises a second magnetic alloy comprising a second magnetic material; and
wherein the first magnetic alloy and the second magnetic alloy each comprises an alloy selected from the group consisting of CoFe, FeNi, CoNiFe, and combinations thereof, wherein the second magnetic material of the second magnetic alloy is different from the first magnetic material of the first magnetic alloy.

19. A method of fabricating a magnetic recording head, comprising:
forming a main pole comprising a first portion and a second portion; and
forming at least one of a trailing shield along a trailing side of the main pole or a leading shield along a leading side of the main pole,
wherein the first portion comprises a first magnetic material, the first portion having a first side forming at least a portion of an air bearing surface (ABS) of the main pole,
wherein the second portion comprises a second magnetic material that is different from the first material, the second portion being spaced apart from the ABS,
wherein the first portion has a first beveled side, a first end and a second end, the first beveled side extending between the first end and the second end, the first end being proximate the ABS,
wherein the second portion has a second beveled side, a third end and a fourth end, the second portion extending between the third end and the fourth end, and the third end being proximate the second end of the first portion, and
wherein the first beveled side and the second beveled side form a first angle and a second angle, respectively, with respect to a plane perpendicular to the ABS, and the first angle and the second angle are substantially the same.

20. A method of fabricating a magnetic recording head, comprising:
forming a main pole comprising a first portion and a second portion, a magnetic property of the first portion being different from a magnetic property of the second portion; and
forming at least one of a trailing shield along a trailing side of the main pole or a leading shield along a leading side of the main pole,
wherein the first portion has a first side forming at least a portion of an air bearing surface (ABS) of the main pole,
wherein the second portion is spaced apart from the ABS,
wherein the first portion has a first beveled side, a first end and a second end, the first beveled side extending between the first end and the second end, the first end being proximate the ABS,
wherein the second portion has a second beveled side, a third end and a fourth end, the second portion extending between the third end and the fourth end, and the third end being proximate the second end of the first portion, and
wherein the first beveled side and the second beveled side form a first angle and a second angle, respectively, with respect to a plane perpendicular to the ABS, and the first angle and the second angle are substantially the same.

* * * * *